(12) United States Patent
Alt

(10) Patent No.: US 8,691,054 B2
(45) Date of Patent: *Apr. 8, 2014

(54) MULTI-STAGE FLASH EVAPORATOR

(76) Inventor: Friedrich Alt, Irvine, CA (US)

( * ) Notice: Subject to any disclaimer, the term of this patent is extended or adjusted under 35 U.S.C. 154(b) by 391 days.

This patent is subject to a terminal disclaimer.

(21) Appl. No.: 13/089,018

(22) Filed: Apr. 18, 2011

(65) Prior Publication Data

US 2012/0261248 A1   Oct. 18, 2012

(51) Int. Cl.
*B01D 3/06* (2006.01)

(52) U.S. Cl.
USPC ............ 202/173; 159/2.1; 159/2.3; 159/43.1; 159/17.2; 159/DIG. 8; 202/153; 202/155; 202/186; 202/187; 202/158; 203/71; 203/87; 203/88; 203/DIG. 9

(58) Field of Classification Search
USPC .................... 159/2.1, 2.3, 43.1, 17.2, DIG. 8; 202/153, 155, 158, 172–174, 186–187, 202/237, 266; 203/71, 87, 88, DIG. 9
See application file for complete search history.

(56) References Cited

U.S. PATENT DOCUMENTS

| | | | |
|---|---|---|---|
| 2,979,443 A | 4/1961 | Frankel | |
| 3,146,177 A | 8/1964 | Chalmers | |
| 3,197,387 A * | 7/1965 | Lawrance | 202/173 |
| 3,356,592 A | 12/1967 | Eubank | |
| 3,398,059 A | 8/1968 | Cane | |
| 3,488,260 A | 1/1970 | Gilbert | |
| 3,503,853 A | 3/1970 | Taubert et al. | |
| 3,515,646 A | 6/1970 | Walker | |
| 3,632,481 A * | 1/1972 | Hammond et al. | 202/173 |
| 3,855,072 A | 12/1974 | Liu | |
| 4,312,710 A | 1/1982 | Tanaka et al. | |
| 4,318,780 A | 3/1982 | Bailie | |
| 4,332,642 A * | 6/1982 | Cane et al. | 202/173 |
| 4,334,904 A * | 6/1982 | Apothaker et al. | 65/36 |
| 4,334,961 A | 6/1982 | Moen | |
| 4,450,904 A * | 5/1984 | Volz | 165/162 |
| 4,591,413 A * | 5/1986 | Peterson | 202/173 |
| 4,871,014 A * | 10/1989 | Sulzberger | 165/76 |
| 5,133,837 A * | 7/1992 | Elmore et al. | 202/173 |
| 5,268,073 A * | 12/1993 | Casper et al. | 159/47.1 |
| 5,968,312 A * | 10/1999 | Sephton | 159/47.1 |
| 7,678,227 B2 | 3/2010 | Alt | |
| 7,850,826 B2 | 12/2010 | Alt | |

* cited by examiner

*Primary Examiner* — Virginia Manoharan

(57) ABSTRACT

The present invention provides a configuration of a multi stage flash cross tube evaporator wherein flash stages are arranged in a plurality of at least two tiers with a first flash stage to which a heated solution is fed, a plurality of intermediate flash stages and a last flash stage from which the concentrated solution is discharged in each tier, wherein the flash stages in each tier are in a serial flow communication and the flash stages of each tier are in parallel flow communication to the flash stages in the other tier(s). Such configuration allows to minimize the size of the tube bundles, flash stages and evaporator shell and consequently minimizing evaporator weight and cost.

2 Claims, 11 Drawing Sheets

MULTI-STAGE FLASH EVAPORATOR

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A SEQUENCE LISTING

Not Applicable.

BACKGROUND OF THE INVENTION

A multi-stage flash evaporator is the main component of a seawater desalination plant for producing distilled water from seawater. Most evaporators for large capacity desalination plants are currently of a 'cross tube' type with all flash stages arranged in a single tier configuration, being build with evaporator unit capacities up to about 25 million gallons per day or about 100,000 cubic meters per day of distillate production.

A multi-stage flash evaporator comprises a plurality of flash stages, in existing plants typically between 15 and 30. While a heated solution, typically seawater or brine, enters the first flash stage at its highest temperature, the solution flashes down in each consecutive flash stage to a lower temperature compared to the temperature of the solution in the previous flash stage, releases some vapor which is then condensed on a tube bundle and collected as distillate. The salt concentration of the solution is increasing toward the last flash stage. A coolant enters with its lowest temperature into the tube bundle(s) at the last flash stage and passes through all tube bundles toward the first flash stage, while its temperature increases in each flash stage relative to its temperature in the previous flash stage as vapor is condensing on the tube bundles. The coolant discharging from the tube bundle(s) of the first flash stage is further heated in a separate heat exchanger, commonly described as the heat input section or brine heater, by an external heat source to a top temperature. The coolant is then used as the solution, also described as flashing brine, fed into the first flash stage.

A multi-stage flash desalination system may be designed as a "once through" process in which one type of coolant is being conveyed through the tube bundles of all flash stages, starting from the last flash stage with the lowest operation temperature to the first flash stage operating at the highest temperature.

The most common design concept for multi stage flash desalination plants is the "brine re-circulation" system, in which the evaporator comprises a heat recovery section and a heat rejection section. The heat rejection section comprises a plurality of flash stages including the last flash stage, in which typically fresh seawater is used as a first coolant for the tube bundles. The heat rejection section is designed such, that the first coolant is capable to remove together with the discharging distillate and the discharging concentrated solution, the majority of the heat introduced into the system through the heat input section. In the heat recovery section, which occupies typically the larger number of flash stages of an evaporator including the first flash stage, the heat released from the solution is recovered by a second coolant and used to bring the second coolant toward the desired top temperature. A mixture of a part of the concentrated solution discharging from the last flash stage of the evaporator and a part of the first coolant discharging from the heat rejection section, described mostly as re-circulating brine, is commonly used as the second coolant for the heat recovery section. The portion of the first coolant used as part of the second coolant, replaces primarily the amount of distillate and concentrated solution discharging from the system. It may be treated in order to limit scaling of the tube bundles and to limit corrosion in the evaporator.

Individual types of evaporators may be differentiated by the tube bundle configuration such as 'long tube' evaporators and 'cross tube' evaporators. In a long tube evaporator, the tube bundles are substantially oriented in the flow direction of the solution in the flash stages. A long tube evaporator typically comprises a plurality of individual evaporator modules. Each module comprises typically one tube bundle with a tube sheet and a water box on each end. The individual evaporator modules are typically internally divided by partition walls into a plurality of flash stages. The tube bundles are also divided by the partition walls into a plurality of tube bundle elements, so that each flash stage comprises one tube bundle element, configured to condense the vapor released from the solution in the individual flash stages. The coolant is typically conveyed through the tube bundles of the individual modules of an evaporator unit in serial flow communication. Evaporator modules comprising two tube bundles fed with coolant in parallel have been designed and build as well. Long tube evaporators have been preferred until about the early 1980's when the maximum evaporator capacities have been in the range of about 30% of current evaporator capacities. The modules of a long tube evaporator may be also arranged in a vertically stacked tier configuration, wherein each tier may comprise a plurality of parallel arranged tube bundles.

The cross tube evaporator became for larger capacities the preferred and more economical evaporator configuration. In a cross tube evaporator, the tube bundles are oriented substantially transversally to the flow direction of the solution in the flash stages. Cross tube type evaporators typically comprise an individual single pass tube bundle in each flash stage. Evaporator configurations with double pass tube bundles in each flash stage or common tube bundles for a pair of flash stages are also known. The cross tube evaporators of the prior art have technically limited possibilities to increase the unit capacities beyond the maximum unit capacities of evaporators currently in operation, mainly due to limitations of available tube length for tube bundles.

The cross tube type evaporators with large unit capacities are typically designed and built in a single tier configuration, meaning, all flash stages being arranged on the same level and operating in a serial flow communication. Multiple tier configurations, with flash stages arranged in two or more tiers stacked on top of each other, wherein each tier comprises a fraction of the total number of the flash stages and all flash stages operating in serial flow communication have been designed and built as well. In some stacked design configurations common horizontal tier partitions have been used between the tiers, while in other cases individual evaporator modules, each having its own shell roof and shell bottom structure, have been stacked on top of each other.

BRIEF SUMMARY OF THE INVENTION

The main concept of the present invention is a multi stage flash cross tube evaporator, comprising a plurality of at least two vertically stacked tiers, wherein each tier comprises a plurality of flash stages including a first flash stage, a last flash stage and a plurality of intermediate flash stages, and wherein the flash stages within each individual tier are configured to operate in a serial flow communication and in parallel to the flash stages in the other tier(s). The present invention is aiming to minimize the overall dimensions, foot print, volume and weight of a multi stage flash cross tube evaporator, to minimize material quantities required, labor cost for the manufacturing and the space required in a plant layout. The present invention is aiming in particular to evaporators with unit capacities equal and larger than those built with configurations of prior art.

A multi stage flash cross tube evaporator of the present invention is suitable for configurations comprising flash stages with tube bundle arrangements of prior art such as individual single pass tube bundles per flash stage or double pass tube bundles with counter current coolant flow per flash stage or common double pass tube bundles with counter current coolant flow per pair of flash stages.

The concept of the present invention allows in comparison to a cross tube evaporator of prior art to reduce the width of the evaporator to a fraction approximately equal to 1/n wherein n would be the number of tiers. The coolant is split into parallel coolant streams fed to the individual tiers. Consequently the tube bundles are reduced in its cross section by the same factor 1/n which reduces the tube bundle width and height and as such it allows to reduce the overall flash stage height or flash stage length or both height and length depending on the optimization of a preferred configuration. This evaporator configuration is resulting in a significant reduction of the evaporator foot print, required shell surface area and tube bundle parts and consequently in significant savings of material quantities and manufacturing cost in comparison to multi stage flash cross tube evaporators of prior art configured in single tier or multiple tier configuration comprising only one set of flash stages operating in serial flow communication.

The width of an evaporator of the present invention is mainly determined by the space required to convey the solution through the flash stages. As the evaporator width would be reduced tentatively by the factor 1/n, the width of the individual tiers multiplied by the factor n would be tentatively equal to the total width of a multi stage flash cross tube evaporator of the prior art, so that the brine flow per meter of food width of the flash stages would remain tentatively equal.

Since the tube length is tentatively determined by the width of the stacked tiers, while the coolant flow and the total tube surface area for the evaporator has to be maintained substantially the same as in a multi stage flash cross tube evaporator of prior art, the tube diameter has to be reduced tentatively by the factor 1/n, while the total number of tubes in an evaporator would increase by a factor n×n. For example using 2,500 tubes per tube bundle with 40 mm diameter and a length of 24,000 mm in a multi stage flash cross tube evaporator of prior art with 24 flash stages, the total number of tubes would be 2,500×24=60,000, while the tube length for a cross tube evaporator of the present invention with a two tier configuration and 24 flash stages per tier would be about 24,000/2=12,000 mm, while the tube diameter would be reduced to about 40/2=20 mm and the number of tubes per tube bundle would be 60,000×4/24 stages/2 tiers=5,000. With half the tube diameter and double the number of tubes per tube bundle the required cross section of each tube bundle would be about half of the cross section of a tube bundle of a multi stage flash cross tube evaporator of prior art. Since in one evaporator of the present invention with a two tier configuration, double the number of tube bundles are required the total cross section of all tube bundles would be substantially the same as in the evaporator of prior art. With half the tube length compared to a multi stage flash cross tube evaporator of prior art, the total volume required for all tube bundles in the evaporator of the present invention would be half the total volume of the tube bundles in the evaporator of prior art.

Compared to a multiple tier configuration of a multi stage flash cross tube evaporator of prior art where all flash stages are in serial flow communication and significant temperature differences can occur between flash stages located on top of each other, there would be in evaporators of the present invention practically no temperature difference between flash stages located on top of each other in individual tiers, since they are operating in parallel at substantially equal temperature and as such no resulting thermal stresses in horizontal partitions and other structural parts between the individual tiers of an evaporator would occur.

This brief summary has been provided, so that the nature of the invention may be understood quickly. A more complete understanding of the invention can be obtained by reference to the following detailed description of the preferred embodiments thereof in connection with the attached drawings.

BRIEF DESCRIPTION OF THE SEVERAL VIEWS OF THE DRAWINGS

The present invention will be better understood from the following detailed description of an exemplary embodiment of the present invention, taken in conjunction with the accompanying drawings in which like reference numerals refer to like parts and in which.

For a better understanding of the present invention, the flow of liquids and vapor are shown in individual Figures in form of arrows indicating in individual positions the main flow direction.

DETAILED DESCRIPTION OF THE INVENTION

Examples of a multi stage flash cross tube evaporator 1 of the present invention are shown in FIG. 1 to FIG. 7, while examples of flow schematics for seawater desalination plants comprising an evaporator 1 of the present invention are shown in FIG. 8 to FIG. 11.

Figure 1:
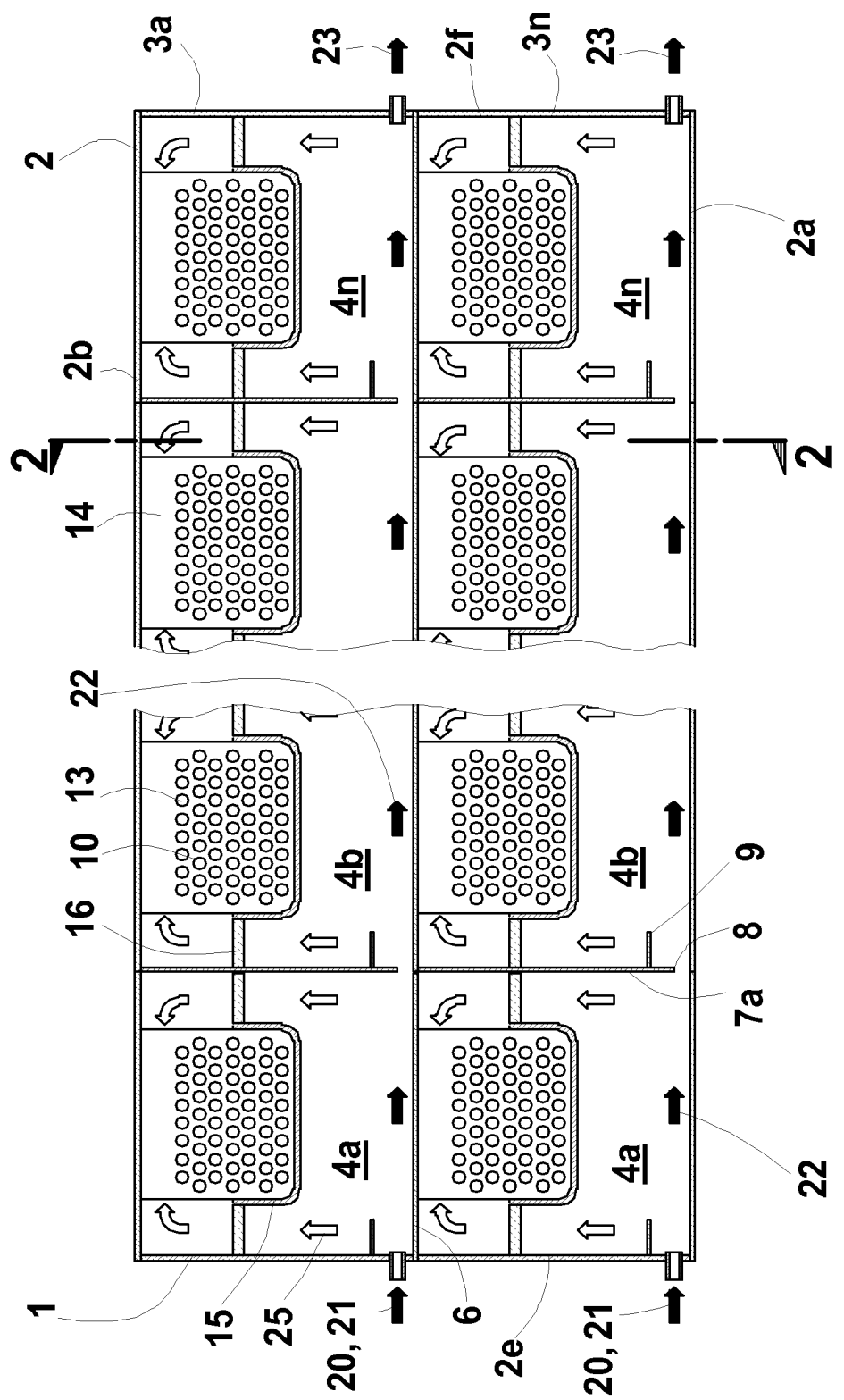
FIG. 1 is a longitudinal section taken along the lines 1-1 as indicated in FIG. 2, showing a first example of the multi stage flash cross tube evaporator of the present invention, with a two tier configuration and single pass tube bundles in each flash stage.
Figure 2:
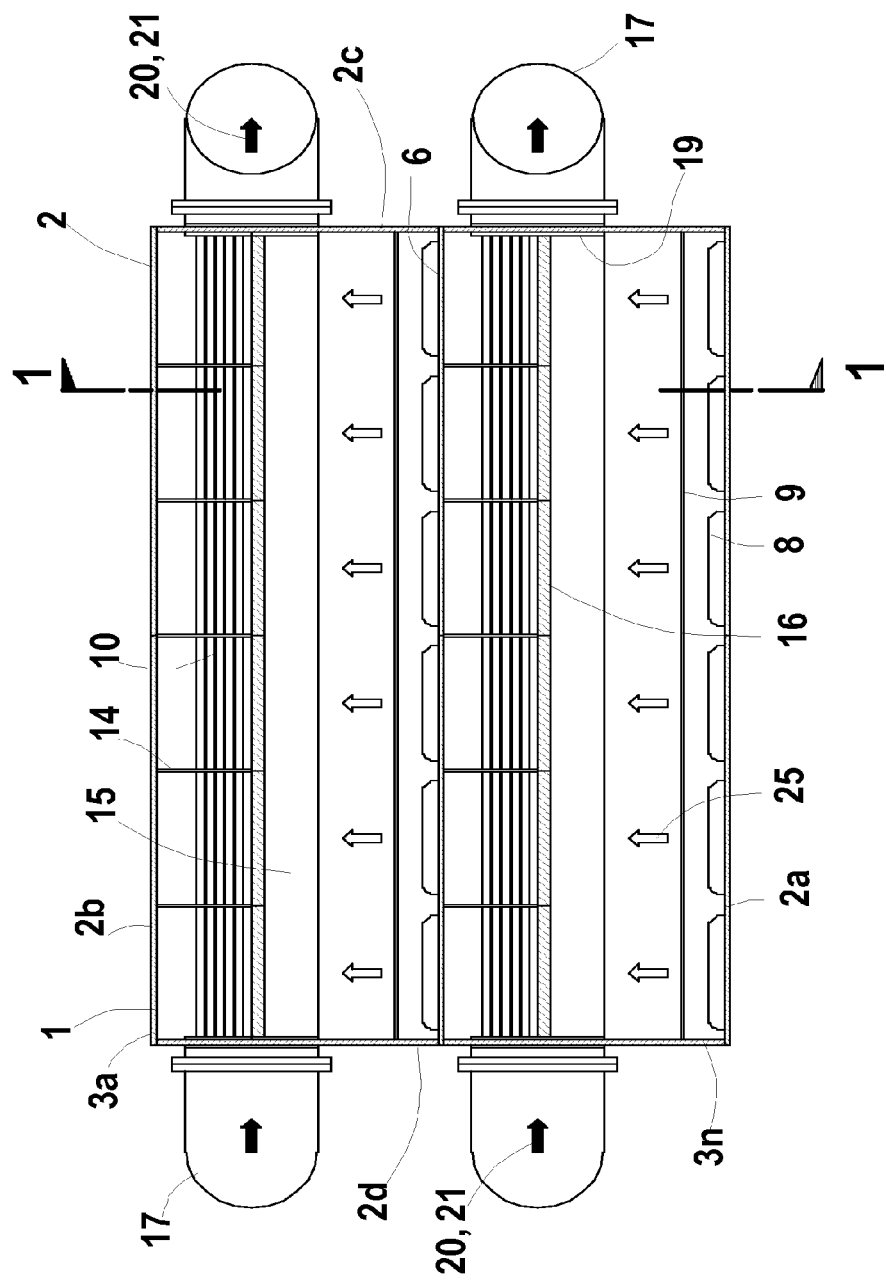
FIG. 2 shows a cross section of the first example of the multi stage flash cross tube evaporator of the present invention, taken along the lines 2-2 as indicated in FIG. 1.

A first example of the multi stage flash cross tube evaporator of the present invention is shown in a longitudinal section FIG. 1 and a cross section FIG. 2. The evaporator 1 comprises an evaporator shell 2 with an evaporator shell bottom 2a, an evaporator shell roof 2b, a left side wall 2c, a right side wall 2d, a front wall 2e and an end wall 2f. The shell 2 is internally divided by at least one horizontal tier partition 6 into a plurality of at least two tiers, with at least a top tier 3a and a bottom tier 3n. Further intermediate tiers may be located in between the top tier 3a and the bottom tier 3n like the tier 3b shown in the schematic FIG. 10. The horizontal tier partition 6 is extending substantially in a longitudinal direction of the evaporator 1 from the front wall 2e to the end wall 2f and in a transversal direction from the left side wall 2c to the right side wall 2d. Each individual tier is divided by a plurality of first flash stage partition walls 7a into a plurality of flash stages, with a first flash stage 4a located in each tier next to the front wall 2e, a plurality of intermediate flash stages like the flash stage 4b and a last flash stage 4n located in each tier next to the end wall 2f. The flash stage partition walls 7a are arranged substantially vertically and in parallel to the front wall 2e and end wall 2f, extending in a transversal direction from the left side wall 2c to the right side wall 2d and in a vertical direction in the bottom tier 3n from the shell bottom 2a to the horizontal tier partition 6 above or in the top tier 3a between the shell roof 2b and the horizontal tier partition 6 below, or in intermediate tiers from one horizontal tier partition located on the bottom side of an intermediate tier to the next horizontal tier partition located on the top of the same intermediate tier.

Figure 8:
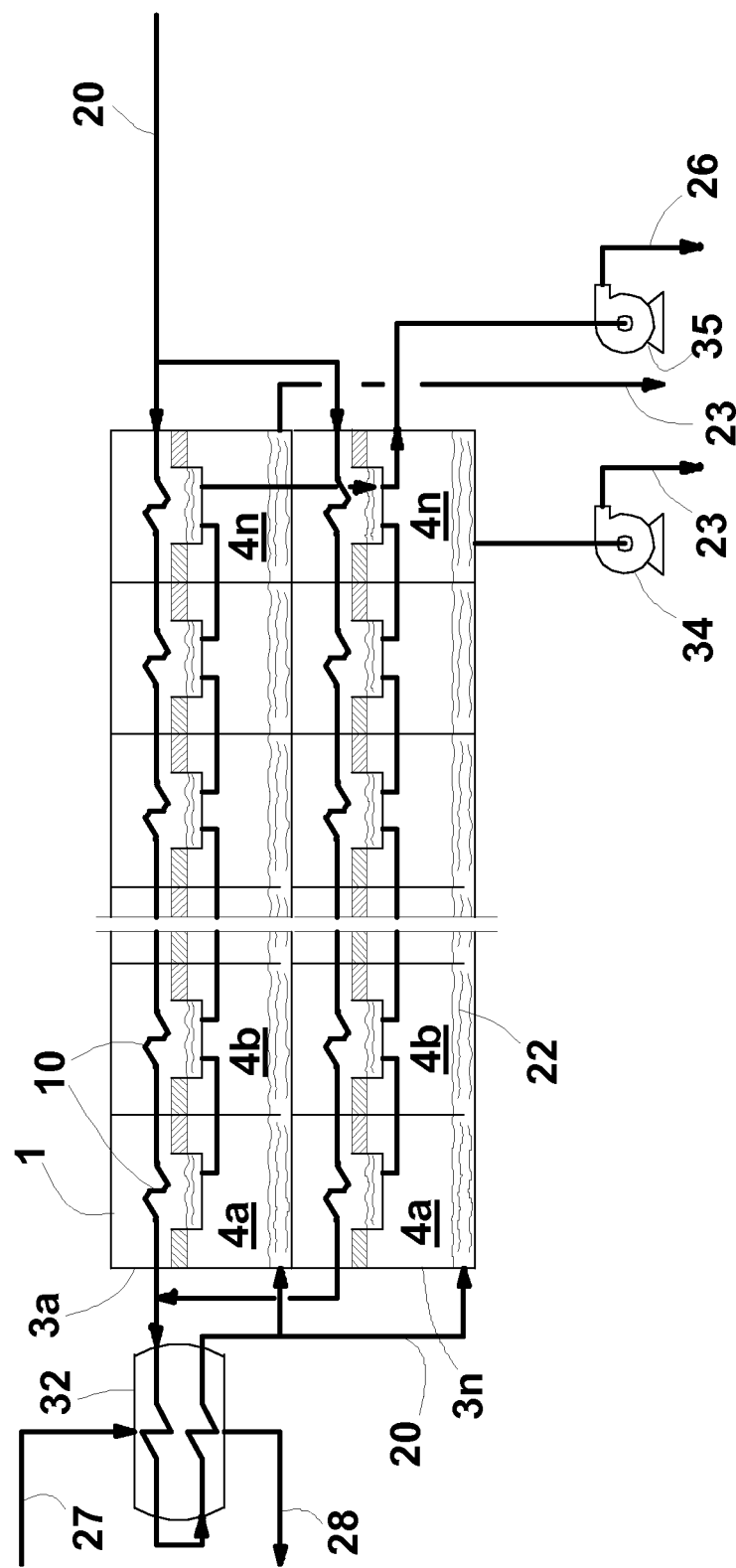
FIG. 8 shows a simplified flow schematic of a desalination unit based on the 'once through' concept with a multi stage flash cross tube evaporator of the present invention as shown in FIGS. 1 and 2.

As also shown in a first example of a desalination plant in the schematic FIG. 8, the evaporator 1 and the associated parts of the evaporator 1 are configured to convey a solution 22 in parallel through the individual tiers and in each tier from the first flash stage 4a through all intermediate flash stages and the last flash stage in serial flow communication, to allow the solution 22 to flash down in each flash stage 4a to 4n to a temperature lower than the temperature of the solution 22 in the previous flash stage, to allow the solution 22 to release a vapor 25 in each flash stage 4a to 4n, to condense the vapor 25 on the tube bundles 10, located in the individual flash stages and to collect the condensed vapor as distillate 26, to accumulate and convey the distillate 26 through all flash stages in the same flow direction as the solution 22, to allow the accumulated distillate 26 to flash down in the flash stages 4b to 4n to a temperature lower than the temperature of the distillate 26 in the previous flash stage, to allow the accumulated distillate 26 to release also some vapor in each of the flash stages 4b to 4n, and to condense this vapor also on the tube bundles 10, located in the individual flash stages.

Mist eliminators 16 may be installed in the individual flash stages such, that the vapor 25 released from the solution 22 is passing through the mist eliminators 16 before entering into and condensing on the tube bundles 10, so that salt water droplets carried in the vapor 25 are largely eliminated, to achieve a desired distillate purity.

A plurality of orifices 8 are located in the first flash stage partition walls 7a. The orifices 8 are arranged over the width of the first flash stage partition walls 7a between the left side wall 2c and the right side wall 2d and are sized such, that the solution 22 can pass through, from one flash stage to the next flash stage, driven by a differential pressure between two flash stages, while maintaining a level of the solution 22 above the solution orifice 8, so that no vapor 25 would pass through the orifice 8. The differential pressure between the flash stages is maintained by the flash down of the solution 22 in each flash stage and the resulting temperatures of the vapor 25 and corresponding saturation pressure in each flash stage.

Splash hoods 9 or similar devices may be installed downstream of the orifices 8.

Figure 3:
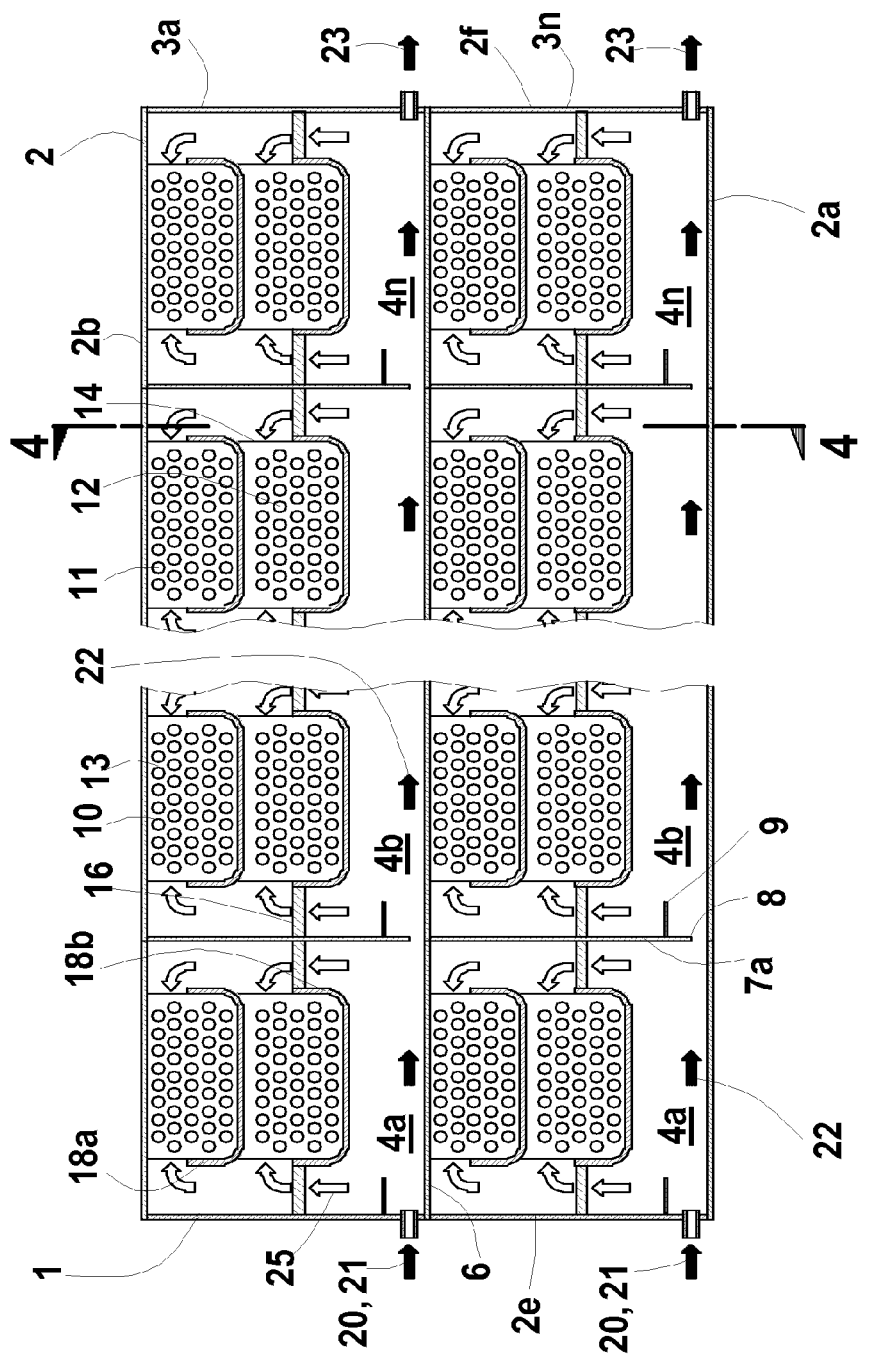
FIG. 3 is a longitudinal section taken along the lines 3-3 as indicated in FIG. 4, showing a second example of the multi stage flash cross tube evaporator of the present invention, with a two tier configuration and double pass tube bundles in each flash stage.
Figure 4:
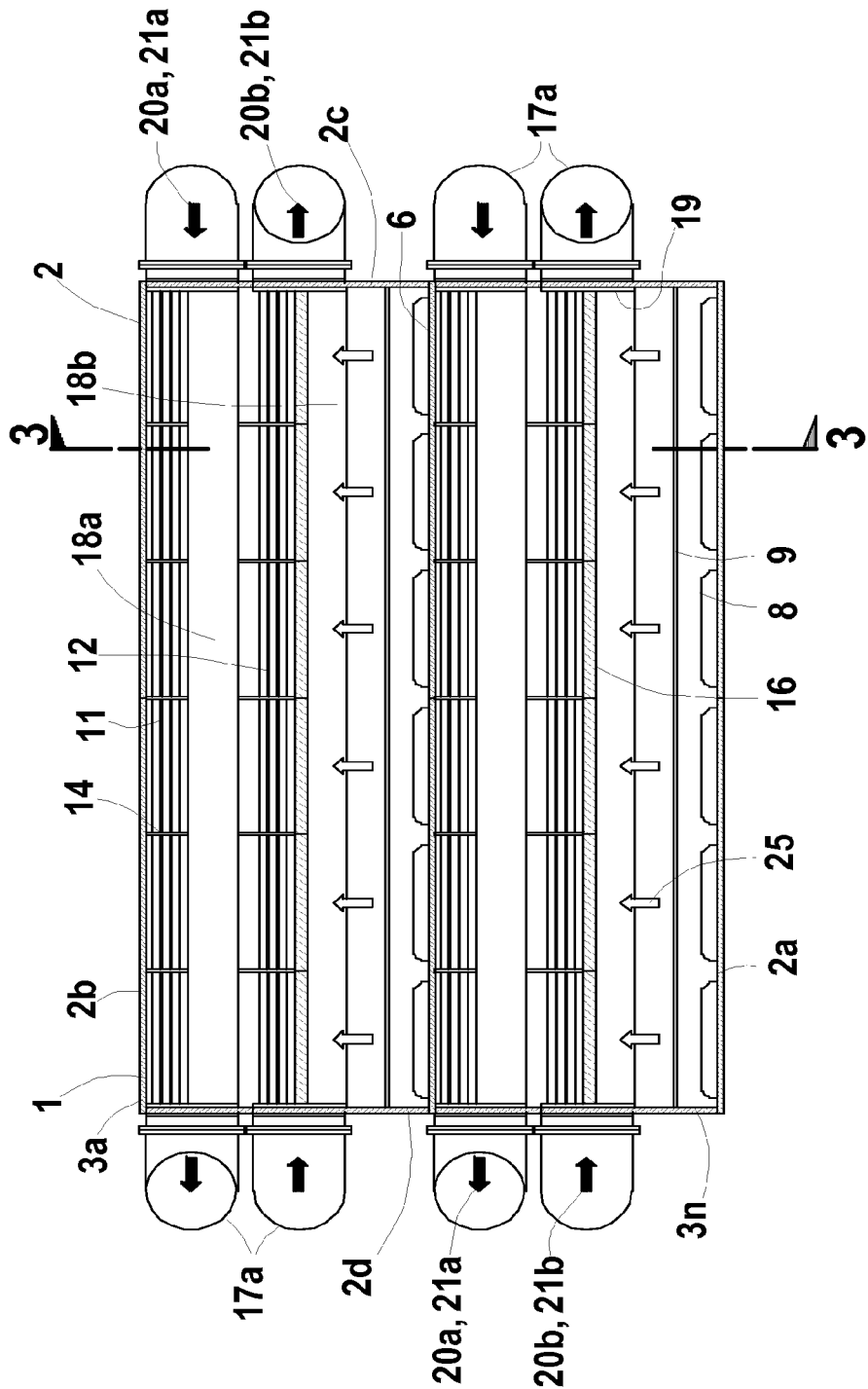
FIG. 4 shows a cross section of the second example of the multi stage flash cross tube evaporator of the present invention, taken along the lines 4-4 as indicated in FIG. 3.
Figure 5:
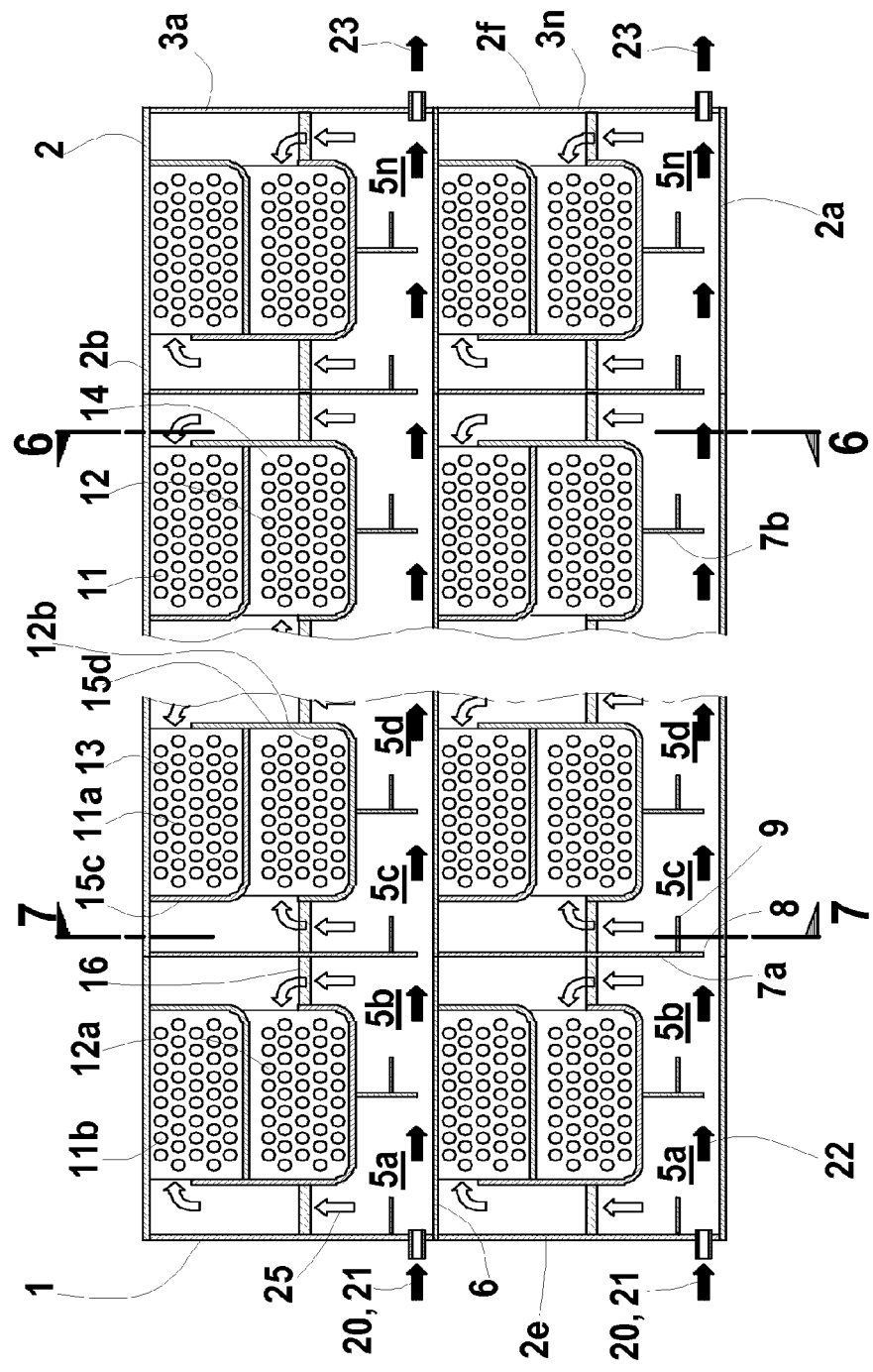
FIG. 5 is a longitudinal section taken along the lines 5-5 as indicated in FIG. 6, showing a third example of the multi stage flash cross tube evaporator of the present invention, with a two tier configuration and common double pass tube bundles in each pair of flash stages.
Figure 6:
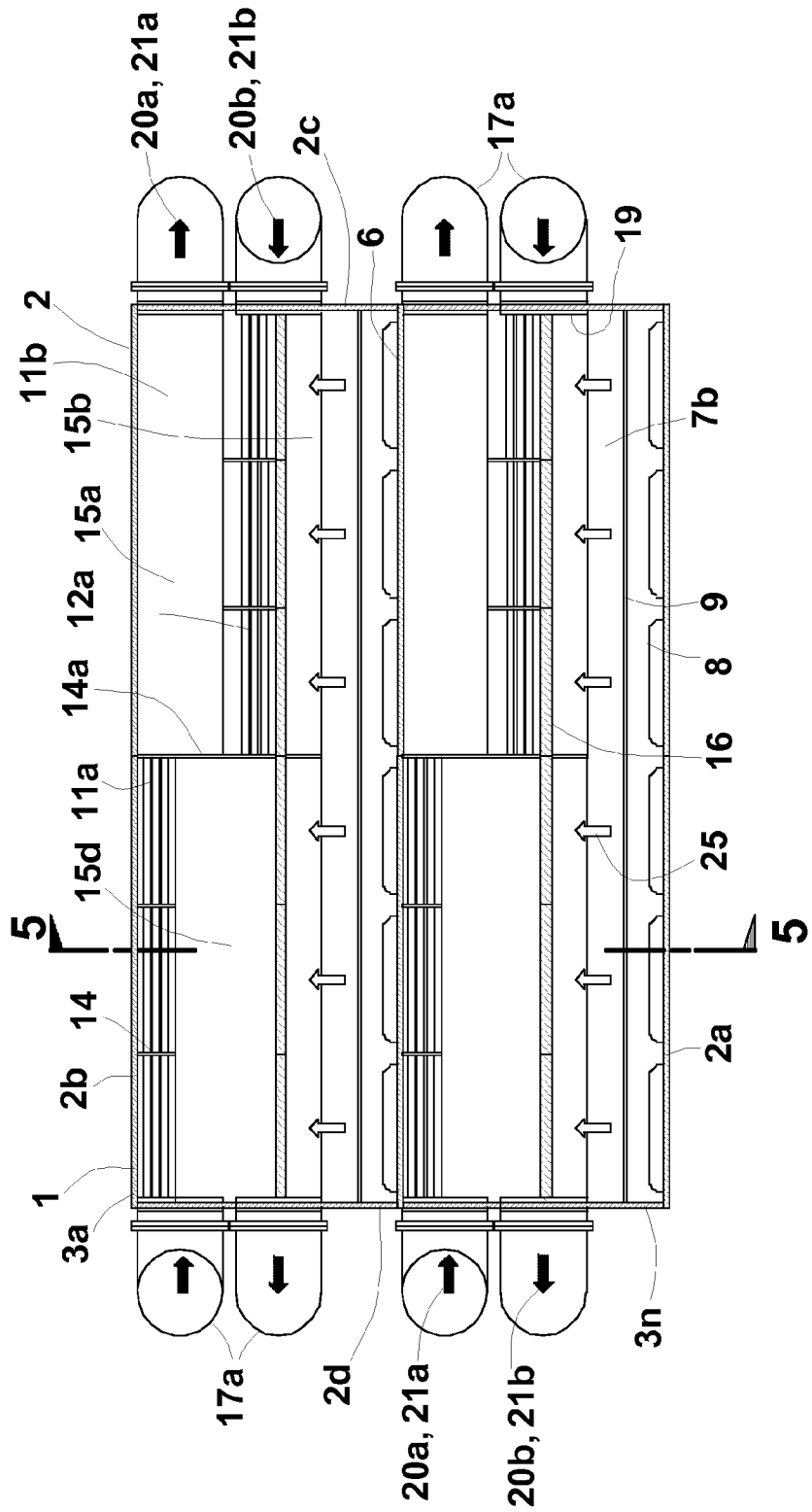
FIG. 6 shows a cross section of the third example of the multi stage flash cross tube evaporator of the present invention, taken along the lines 6-6 as indicated in FIG. 5.
Figure 7:
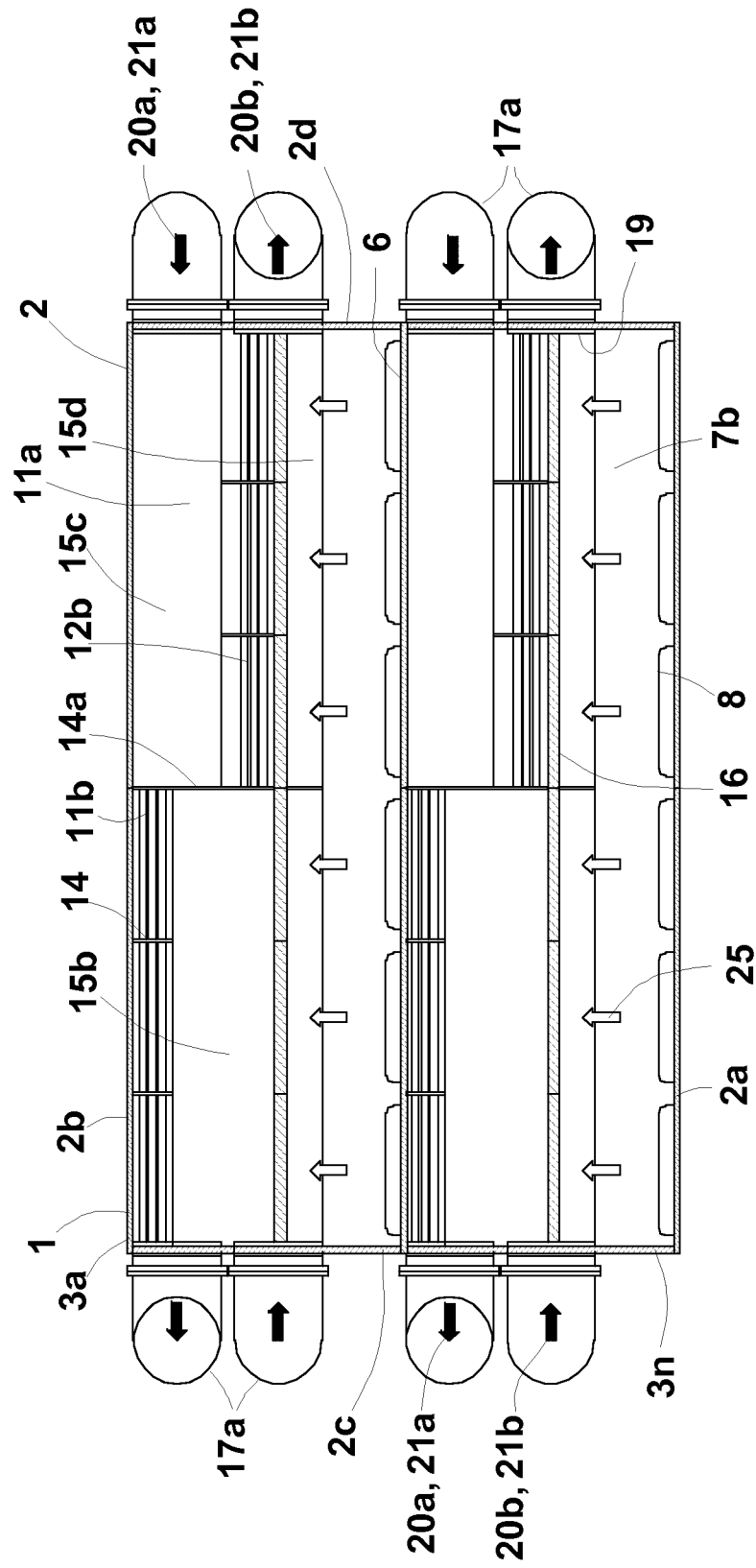
FIG. 7 shows a cross section of the third example of the multi stage flash cross tube evaporator of the present invention, taken along the lines 7-7 as indicated in FIG. 5.

A multi stage flash cross tube evaporator 1 of the present invention may comprise different tube bundle configurations as applied in multi stage flash cross tube evaporators of prior art, such as single pass tube bundles in each flash stage as shown in a first example in FIG. 1 and FIG. 2, or double pass tube bundles in each flash stage as shown in a second example in FIG. 3 and FIG. 4, or a common double pass tube bundle for a pair of flash stages as shown in a third example in FIGS. 5 to 7.

In the first example of a multi stage flash cross tube evaporator of the present invention wherein each flash stage comprises a single pass tube bundle as shown in FIG. 1 and FIG. 2, each tube bundle 10 extends in transversal direction substantially from the left side wall 2c to the right side wall 2d. Each tube bundle 10 comprises a plurality of straight tubes 13 arranged substantially horizontally and in transversal direction and tube sheets 19, one of each installed on or near to the left side wall 2c and right side wall 2d and, if required, a plurality of tube support plates 14, installed in between the tube sheets 19. The tube sheets 19 and the tube support plates 14 have tube holes arranged in the same pattern, to allow the installation of the straight tubes 13. Water boxes 17 are installed on each of the tube bundles 10, to feed a first coolant 20 or a second coolant 21 into each tube bundle 10 and to collect the first coolant 20 or second coolant 21 discharging from each of the tube bundles 10. A tube bundle shell 15 is formed around the lower part of the tube bundle 10, to guide the vapor 25 released from the solution 22 through the mist eliminator 16 before entering into the tube bundle 10. The tube bundle shell 15 serves also to accumulate the distillate 26 generated from the vapor condensing on the tube bundle 10.

A second example of a multi stage flash cross tube evaporator of the present invention wherein each flash stage comprises a double pass tube bundle is shown in FIG. 3 and FIG. 4. Each tube bundle 10 comprises a first tube bundle pass 11 and a second tube bundle pass 12, wherein both tube bundle passes are extending in transversal direction substantially from the left side wall 2c to the right side wall 2d. Each tube bundle pass 11 and 12 comprises a plurality of straight tubes 13 arranged substantially horizontally and in transversal direction and tube sheets 19, one of each installed on or near to the left side wall 2c and right side wall 2d and, if required, a plurality of tube support plates 14, installed in between the tube sheets 19. The tube sheets 19 and the tube support plates 14 have tube holes arranged in the same pattern, to allow the installation of the straight tubes 13. Water boxes 17a are installed on each of the tube bundle passes. The first coolant 20 is divided in each tier into a first part of the first coolant 20a and a second part of the first coolant 20b, while the second coolant 21, if used, is divided into a first part of the second coolant 21a and a second part of the second coolant 21b. The tube bundle passes and water boxes are configured such that the first part of the first coolant 20a or first part of the second coolant 21a is passing through the first tube bundle pass 11 of a tube bundle, while the second part of the first coolant 20b or second part of the second coolant 21b is passing through the second tube bundle pass 12 and further such, that the first part of the first coolant 20a or first part of the second coolant 21a passes through the first tube bundle pass 11 in opposite direction to the second part of the first coolant 20b or second part of the second coolant 21b passing through the second tube bundle pass 12. An individual tube bundle shell 18a may be installed on the first tube bundle pass 11 while an individual tube bundle shell 18b may be installed on the second tube bundle pass 12 as shown in FIG. 3, so that distillate from the condensing vapor may be collected individually on each tube bundle pass. Alternatively the double pass tube bundle may be configured without the tube bundle shell 18a, collecting all distillate in the tube bundle shell 18b.

A third example of a multi stage flash cross tube evaporator of the present invention is shown in FIG. 5 to FIG. 7, wherein basically a single flash stage like flash 4a or 4b or the last flash stage 4n as shown in FIG. 3 is divided into a pair of flash stages, with a first flash stage like 5a or 5c and a second flash stage like flash stage 5b or 5d or like the last flash stage 5n as shown in FIG. 5. Both flash stages in one pair of flash stages are comprising consequently one common double pass tube bundle. The tube bundle comprises like in the second example shown in FIG. 3 and FIG. 4 a first tube bundle pass 11 and a second tube bundle pass 12, wherein both tube bundle passes are extending in transversal direction substantially from the left side wall 2c to the right side wall 2d. Each tube bundle pass 11 and 12 comprises a plurality of straight tubes 13 arranged substantially horizontally and in transversal direction and tube sheets 19, one of each installed on or near to the left side wall 2c and right side wall 2d and, if required, a plurality of tube support plates 14, installed in between the tube sheets 19. The tube sheets 19 and the tube support plates 14 have tube holes arranged in the same pattern, to allow the installation of the straight tubes 13. Water boxes 17a are installed on each of the tube bundle passes. The first coolant 20 is divided in each tier into a first part of the first coolant 20a and a second part of the first coolant 20b, while the second coolant 21, if used, is divided into a first part of the second coolant 21a and a second part of the second coolant 21b. The tube bundle passes and water boxes are configured such that the first part of the first coolant 20a or first part of the second coolant 21a is passing through the first tube bundle pass 11 of a tube bundle, while the second part of the first coolant 20b or second part of the second coolant 21b is passing through the second tube bundle pass 12 and further such, that the first part of the first coolant 20a or first part of the second coolant 21a passes through the first tube bundle pass 11 in a direction opposite to the direction the second part of the first coolant 20b or second part of the second coolant 21b is passing through the second tube bundle pass 12. A tube support plate 14a is arranged substantially in the middle between the tube sheets 19, so that the first tube bundle pass 11 is divided into a first tube bundle pass section 11a, to which the first part of the first coolant 20a or first part of the second coolant 21a enters, and a second tube bundle pass section 11b from which the first part of the first coolant 20a or first part of the second coolant 21a discharges, while the second tube bundle pass 12 is divided into a first tube bundle pass section 12a to which the second part of the first coolant 20b or second part of the second coolant 21b enters and a second tube bundle pass section 12b from which the second part of the first coolant 20b or second part of the second coolant 21b discharges. A second partition wall 7b is installed below the tube bundle, acting together with the tube support plate 14a and a first tube bundle shell part 15a, a second tube bundle shell part 15b, a third tube bundle shell part 15c and a fourth tube bundle shell part 15d as partition between the two flash stages sharing one common tube bundle like the flash stages 5a and 5b. The second partition wall 7b is extending vertically from the tube bundle shell parts 15b and 15d to the shell bottom 2a or tier partition 6 located below and in transversal direction from the left side wall 2c to the right side wall 2d. Orifices 8 are also located in the second partition walls 7b, to allow the solution 22 to pass from one flash stage to the next like from flash stage 5a to 5b. The first tube bundle shell part 15a partly encloses the second tube bundle pass section of the first tube bundle pass 11b, the second tube bundle shell part 15b partly encloses the first tube bundle pass section of the second tube bundle pass 12a, the third tube bundle shell part 15c partly encloses the first tube bundle pass section of the first tube bundle pass 11a and the fourth tube bundle shell part 15d partly encloses the second tube bundle pass section of the second tube bundle pass 12b, so that substantially only a vapor 25 released from the solution 22 in the first flash stage of a pair of flash stages like 5a can condense on the second tube bundle pass sections 11b and 12b from which the first part of the first coolant 20a or first part of the second coolant 21a and the second part of the first coolant 20b or the second part of the second coolant 21b are discharging and further such that substantially only a vapor 25 released from the solution 22 in the second flash stage of the pair of flash stages like 5b can condense on the first tube bundle pass sections 11a and 12a to which the first part of the first coolant 20a or first part of the second coolant 21a respectively the second part of the first coolant 20b or second part of the second coolant 21b are entering.

Since tube bundles respectively tube bundle passes of all flash stages in a once through type evaporator or the tube bundles respectively tube bundle passes in the heat rejection section or heat recovery section of an evaporator used in a brine recirculation system are in each tier in a serial flow communication the first part of the first coolant 20a or first part of the second coolant 21a and the second part of the first coolant 20b or second part of the second coolant 21b may enter into the tube bundle pass located in one pair of flash stages from the same side of the evaporator as it is discharging from the tube bundle pass located in the pair of flash stages located downstream. Consequently the side from which a coolant stream is entering into a tube bundle pass or discharging from a tube bundle pass is alternating from one pair of flash stages to the next, respectively from one tube bundle to the next, so that the arrangement of the tube bundle shell parts 15a, 15b, 15c and 15d is alternating as well, as can be seen in FIG. 5 when comparing for example the arrangement in the flash stages 5a and 5b to the arrangement in the flash stages 5c and 5d.

In case of a once through configuration as shown in the schematic in FIG. 8 with an evaporator configuration comprising a top tier 3a and a bottom tier 3n, wherein each individual flash stage comprises a single pass tube bundle, means are configured such that the first coolant 20 is feed in parallel into the tube bundles located in the last flash stage 4n of each tier and passes through the tube bundles 10 located in each flash stage of a tier in serial flow communication and discharges from the tube bundles 10 located in the first flash stages 4a of each tier.

Figure 9:
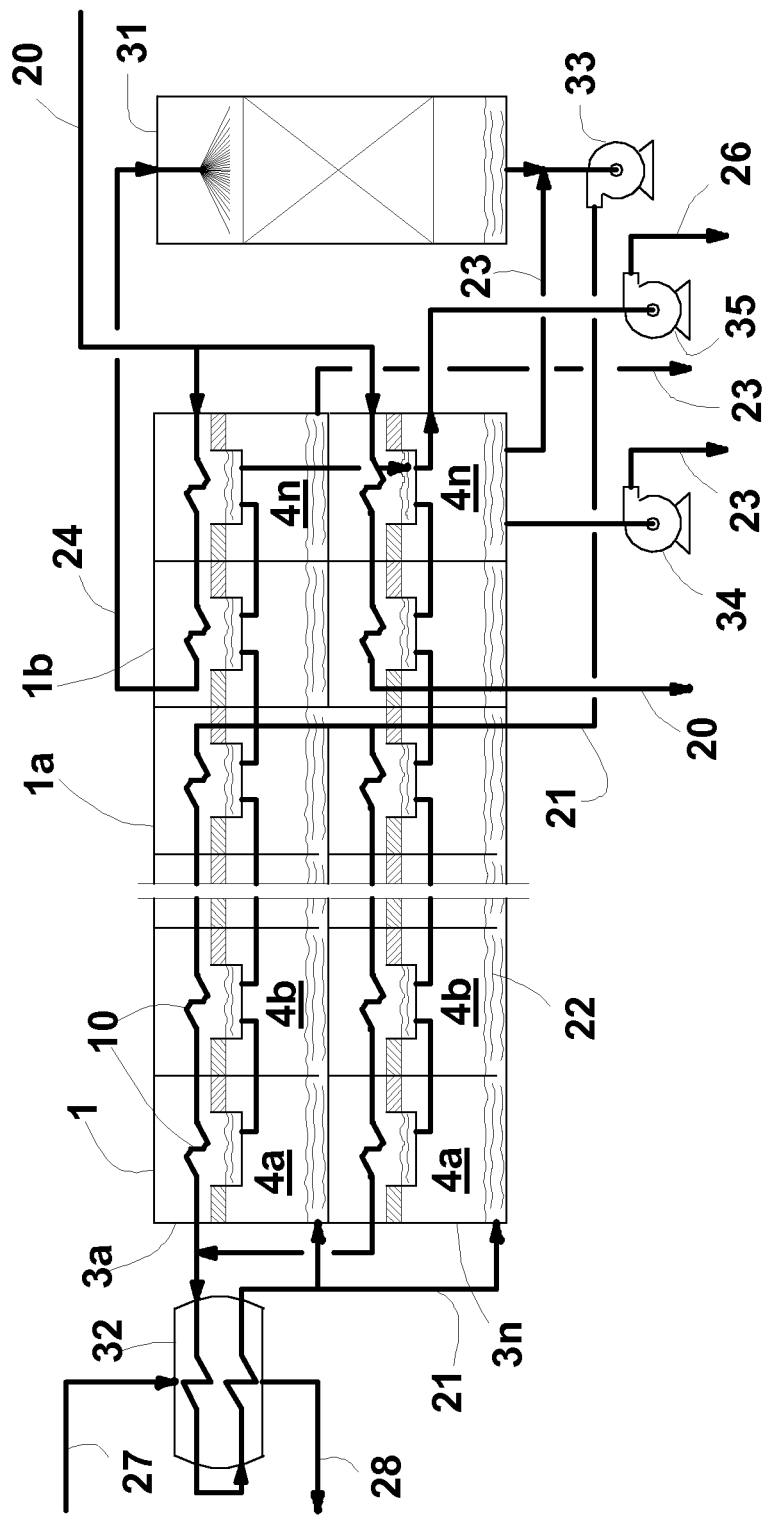
FIG. 9 shows a simplified flow schematic of a desalination unit based on the 'brine recirculation' concept with a multi stage flash cross tube evaporator of the present invention as shown in FIGS. 1 and 2.
Figure 10:
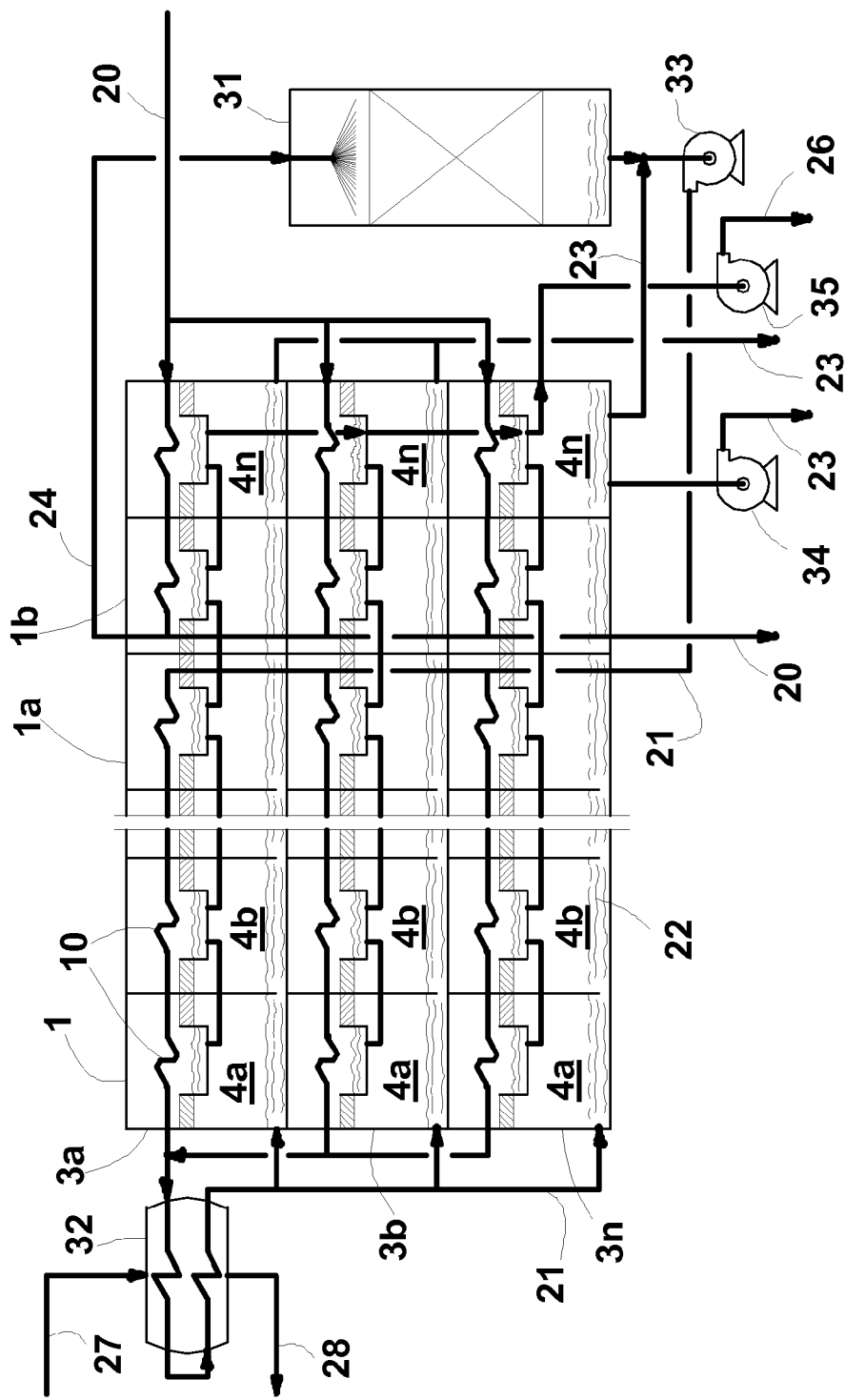
FIG. 10 shows a simplified flow schematic of a desalination unit based on the 'brine recirculation' concept with an example of the multi stage flash cross tube evaporator of the present invention, with a 3 tier configuration and single pass tube bundles in each flash stage.

In case of a brine recirculation concept as shown in the schematic in FIG. 9 with an evaporator configuration comprising a top tier 3a and a bottom tier 3n or as shown in the schematic in FIG. 10 with an evaporator configuration comprising in addition an intermediate tier 3b, wherein each flash stage comprises a single pass tube bundle, the evaporator is divided into a heat recovery section 1a comprising the first flash stage 4a and the majority of the intermediate flash stages in each tier and a heat rejection section 1b comprising the remaining intermediate flash stages and the last flash stage 4n in each tier. Means are provided to feed the first coolant 20 in parallel into the tube bundles located in the last flash stages 4n of each tier, to pass the first coolant 20 through the tube bundles 10 located in each flash stage of the heat rejection section 1b of each tier in serial flow communication and to discharge from the tube bundles 10 located in the first intermediate flash stage of the heat rejection section in each tier. Further, means are provided to feed the second coolant 21 in parallel into the tube bundles located in the last intermediate flash stage of the heat recovery section 1a in each tier, to pass through the tube bundles 10 located in each intermediate flash stage and the first flash stage 4a of the heat recovery section of each tier in serial flow communication and to discharge from the tube bundles 10 located in the first flash stage 4a.

Figure 11:
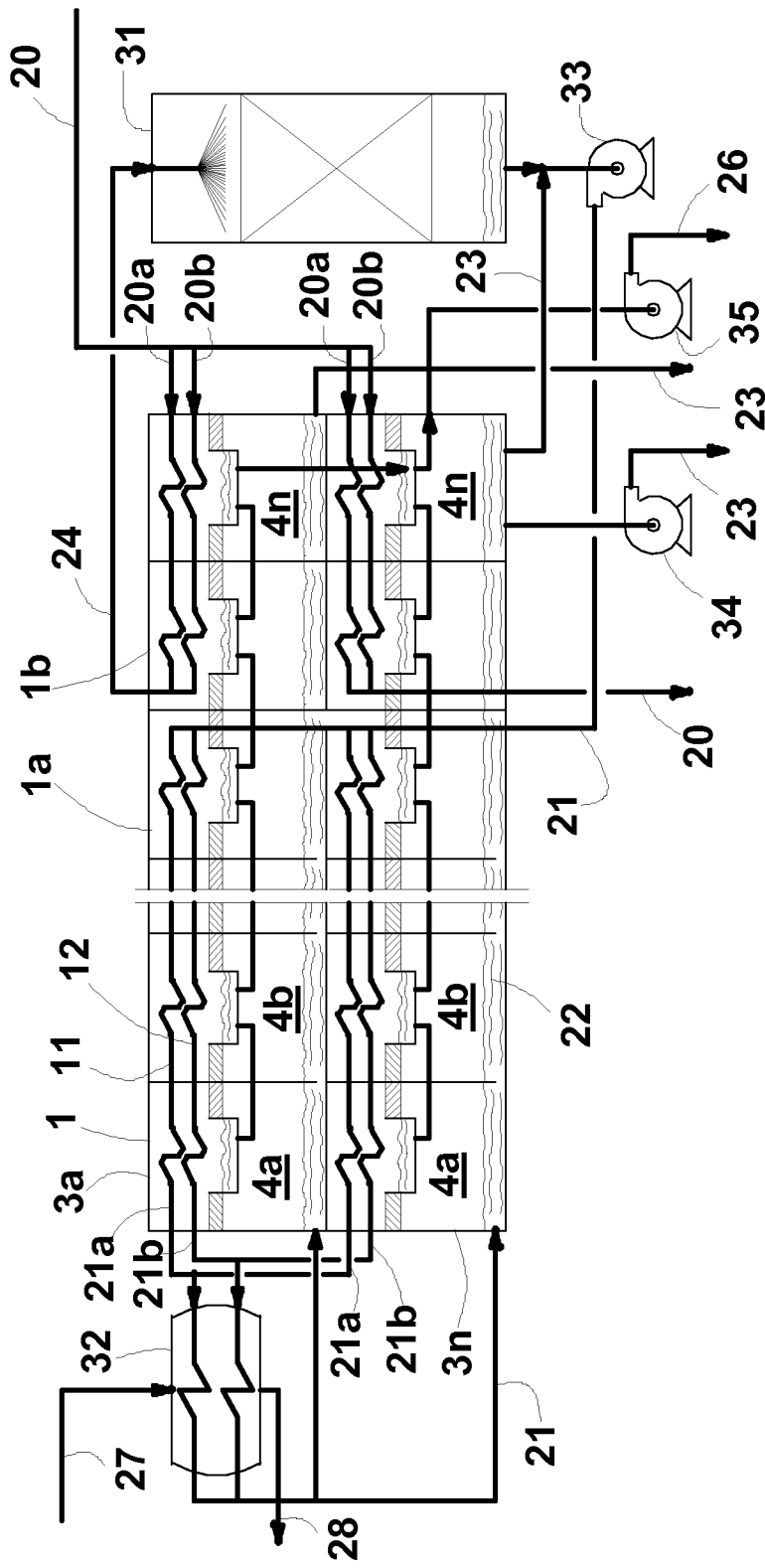
FIG. 11 shows a simplified flow schematic of a desalination unit based on the 'brine recirculation' concept with an example of the multi stage flash cross tube evaporator of the present invention, with a two tier configuration and double pass tube bundles in each flash stage as shown in FIG. 3 and FIG. 4.

In case of a brine recirculation concept as shown in the schematic in FIG. 11 with an evaporator configuration comprising a top tier 3a and a bottom tier 3n, wherein each flash stage comprises a double pass tube bundle, the evaporator is divided into a heat recovery section 1a comprising the first flash stage 4a and the majority of the intermediate flash stages in each tier and a heat rejection section 1b comprising the remaining intermediate flash stages and the last flash stage 4n in each tier. Means are provided to divide the first coolant 20 in each tier into a first part of the first coolant 20a and a second part of the first coolant 20b, and further means to feed the first part of the first coolant 20a in parallel into the tube bundle passes 11 located in the last flash stages 4n of each tier, to pass the first part of the first coolant 20a through the tube bundle passes 11 located in each flash stage of the heat rejection section 1b of a tier in serial flow communication and to discharge it from the tube bundle passes 11 located in the first intermediate flash stage of the heat rejection section and further means to feed the second part of the first coolant 20b in parallel into the tube bundle passes 12 located in the last flash stages 4n of each tier, to pass the second part of the first coolant 20b through the tube bundle passes 12 located in each flash stage of the heat rejection section 1b of a tier in serial flow communication and to discharge it from the tube bundle passes 12 located in the first intermediate flash stage of the heat rejection section. Further means are provided to divide the second coolant 21 in each tier into a first part of the second coolant 21a and a second part of the second coolant 21b, and further means to feed the first part of the second coolant 21a in parallel into the tube bundle passes 11 located in the last intermediate flash stages located in each tier of the heat recovery section 1a, to pass the first part of the second coolant 21a through the tube bundle passes 11 located in each flash stage of the heat recovery section 1a of a tier in serial flow communication and to discharge it from the tube bundle passes 11 located in the first flash stage 4a and further means to feed the second part of the second coolant 21b in parallel into the tube bundle passes 12 located in the last intermediate flash stages of the heat recovery section 1a of each tier, to pass the second part of the second coolant 21b through the tube bundle passes 12 located in each flash stage of the heat recovery section 1a of a tier in serial flow communication and to discharge it from the tube bundle passes 12 located in the first flash stage 4a. The counter current flow direction of the first part of the first coolant 20a in the first tube bundle pass relative to the flow direction of the second part of the first coolant 20b in the second tube bundle pass or the counter current flow direction of the first part of the second coolant 21a in the first tube bundle pass relative to the flow direction of the second part of the second coolant 21b in the second tube bundle pass as illustrated in FIG. 3 and FIG. 4 are for reasons of simplification of the schematic not illustrated in FIG. 11.

The flow schematic shown in FIG. 11 corresponds with the evaporator configuration with flash stages comprising individual double pass tube bundles as illustrated in FIG. 3 and FIG. 4. The flow schematic is equally applicable to the evaporator configuration comprising a common double pass tube bundle per pair of flash stages, like 5a and 5b as illustrated in FIG. 5 to FIG. 7.

The examples of evaporator configurations shown in FIGS. 1 to 7 may be applied to a once through system or a brine recirculation system.

The multi stage flash cross tube evaporator of the present invention allows to install in the described multiple tier configuration also a combination of different flash stage configurations and tube bundle configurations. For example all or a part of the flash stages of the heat recovery section may be configured using common double pass tube bundles for pairs of flash stages as illustrated in FIG. 5, while some flash stages of the heat rejection section may comprise individual double pass tube bundles as illustrated in FIG. 3, while the flash stages of the heat rejection section may be configured at the same time with individual single pass tube bundles as per FIG. 1 or with individual double pass tube bundles as per FIG. 3.

In case of the once through system as illustrated in FIG. 8 only the first coolant 20 is used which is typically non-concentrated seawater, whereby other types of coolants, like a brine solution with a salt concentration higher than the natural seawater is possible as well. The first coolant 20 is heated up as it is passing through the tube bundles of the individual flash stages while the vapor 25 released in the individual flash stages is condensing on the outer surface of the tube bundles. After discharging from the tube bundles of the first flash stage of the individual tiers, the first coolant 20 is passing typically through a brine heater 32, also described as heat input section, where the first coolant is heated typically by steam 27 to its top temperature, before it is entering into the first flash stages 4a or 5a of the individual tiers. The condensate 28 generated from the steam 27 condensing in the brine heater or heat input section, is typically returned to the boiler plant from where the steam 27 is typically supplied. As the first coolant 20 enters into the first flash stages 4a or 5a in the individual tiers with its maximum temperature, it flashes down to a lower temperature and releases some vapor 25, which is condensing on the tube bundle 10. The first coolant becomes a solution 22 with a concentration which is increasing as the flash down and vapor release is repeated as the solution is passing from one flash stage to the next until the solution reaches the highest concentration in the last flash stage and is discharged as concentrated brine 23. An evaporator comprising in each flash stage a double pass tube bundle as shown in FIG. 3 and FIG. 4 or an evaporator comprising a common double pass tube bundle for a pair of flash stages as illustrated in FIGS. 5 to 7 is equally applicable for a once through desalination unit using only the first coolant 20.

In the case of the brine recirculation systems as illustrated in the FIGS. 9 to 11, the first coolant 20 which is typically non-concentrated seawater, is used in the heat rejection section 1b. The first coolant 20 is heated up as it is passing through the tube bundles of the individual flash stages located in the heat rejection section, while the vapor 25 released in the individual flash stages is condensing on the outer surface of the tube bundles. After discharging from the tube bundles of the first intermediate flash stage located in the individual tiers in the heat rejection section, a part of the first coolant 20 may be used as make-up water 24 while the remaining part of the first coolant 20 may be discharged. Depending on the required amount of make-up water 24 the first coolant 20 passing through one tier may be completely used as make up water as shown in FIG. 9, while the first coolant 20 passing through the tube bundles of the lower tier would be completely discharged. In other cases, a part or all of the first coolant 20 discharging from both tiers may be used as make-up water. The make-up water 24 is passing through a deaerator 31, where the majority of dissolved gases are removed before it is mixed with a part of the concentrated brine 23 and then pumped by a brine recirculation pump(s) 33 as second coolant 21 through the tube bundles of the heat recovery section. Depending on the system arrangement, the concentrated brine 23 may be discharged from the top tier 3a by gravity flow, without using a pump as shown for example in FIG. 9, while a part of the concentrated brine 23 from the last flash stage of the lower tier 3n may be mixed with the make-up water and a remaining part may be discharged by a blow down pump 34. In some cases all of the concentrated brine in the lower tier may be re-circulated, in which case no blow down pump may be required. The second coolant 21, also commonly described as re-circulating brine is heated up as it is passing through the tube bundles of the individual flash stages in the heat recovery section 1a, while the vapor 25 released in the individual flash stages is condensing on the outer surface of the tube bundles. After discharging from the tube bundles of the first flash stage of the individual tiers, the second coolant 21 is passing like in the once through system typically through a brine heater 32, also described as heat input section, where the second coolant is heated typically by steam 27 to its top temperature, before it is entering into the first flash stages 4a or 5a of the individual tiers. The condensate 28 generated from the steam 27 condensing in the brine heater or heat input section, is typically returned to the boiler plant from where the steam 27 is typically supplied. As the second coolant 21 enters into the first flash stages 4a or 5a in the individual tiers at its maximum temperature, it flashes down to a lower temperature and releases some vapor 25, which is condensing on the tube bundle 10. The second coolant becomes a solution 22 with a concentration which is increasing as the flash down and vapor release is repeated as the solution is passing from one flash stage to the next until the solution reaches the highest concentration in the last flash stage and is discharged as concentrated brine 23 or partly mixed with the make-up water 24 and re-circulated.

In place of a common brine heater 32 as shown in the schematics FIG. 8 to FIG. 11 individual brine heaters may be installed for each tier or any other number of brine heaters would be possible as well.

In the brine recirculation process as well as in the once through process, the accumulated distillate 26 is typically discharged from the last flash stages 4n or 5n over a distillate pump(s) 35.

The evaporators described and shown in FIGS. 1 to 7 provide the general concept of the present invention, which is the configuration of a plurality of at least two tiers stacked on top of each other, wherein each tier comprises a plurality of flash stages configured to operate in each tier in parallel to the flash stages in the other tier(s). Different shapes or configurations of parts as shown in the described examples may be applied without changing the general concept or function of the evaporator of the present invention. For example tube bundles 10 of circular shape may be used, solution orifices 8 and splash hoods 9 may be designed in a different way than shown, shell parts like the shell bottom 2a, shell roof 2b, left side wall 2c, right side wall 2d, front wall 2e and end wall 2f, horizontal tier partitions 6 and flash stage partition walls 7a and 7b may be curved or may be shaped in other forms than the flat plates shown in FIGS. 1 to 7.

Details like the venting of non-condensable gases from the tube bundles 10 or tube bundle passes 11 and 12 are not shown, since those are commonly known details for tube bundles or evaporators. Also the transport of accumulated distillate from one flash stage to the next is not shown in detail, as it is a commonly known detail for evaporators.

With the configuration of at least two tiers, each comprising a plurality of flash stages 4a to 4n or 5a to 5n and the flash stages of individual tiers are operating in parallel, the width of the flash stages and the length of the tube bundles installed in transversal direction in between the left side wall 2c and the right side wall 2d are tentatively reduced by factor 1/n with n being the number of tiers. Since in such case the tube bundles can be build with tubes having a smaller diameter and shorter tube length compared to multi stage flash cross tube evaporators of prior art, tube bundles and flash stages can be build more compact. As also the shell bottom and shell roof are significantly reduced in size and the flash stage height and length can be reduced, the entire evaporator can be build with less material, reducing weight and material cost, while reducing at the same time also a space required for the installation. The configuration of the multi stage flash cross tube evaporator of the present invention allows to increase unit capacity of an evaporator 1 without compromising on process parameters like specific solution flow rate of the solution per unit width of the flash stages like tons of solution per food or per meter width between the left side wall 2c and the right side wall 2d.

The individual tiers of the multi stage flash cross tube evaporator 1 of the present invention may be also build with individual shell roof and shell bottom for each tier, replacing the horizontal tier partitions.

The wall thickness of evaporator shell parts and sizes of individual parts shown in the FIGS. 1 to 7 are at least partly not shown in true proportion to the evaporator size, but are shown significantly larger for purpose of illustration of the design concept.

The expression 'longitudinal' used in the description of the evaporator 1 is the direction of the flow of the solution 22, while the expressions 'transversal' or 'cross' relate to the orientation perpendicular to the flow direction of the solution 22. The expression 'front' relates to the evaporator side where the first flash stages 4a or 5a are located in the individual tiers, while the expression 'end' relates to the opposite side of the evaporator 1 where the last flash stages 4n or 5n are located in the individual tiers. The expression 'left' and 'right' are orientations related to a view direction from the 'front' toward the 'end'. The expressions first and last intermediate flash stage are related to the flow direction of the solution 22, counting the intermediate flash stages in between the first flash stage and the last flash stage of the evaporator 1 or through the heat recovery section 1a or heat rejection section 1b.

Expressions like 'front', 'end', 'left', 'right', 'top', 'bottom', 'longitudinal', 'transversal' in conjunction with the description of the evaporator parts, parts configuration, flow direction etc. are used for the purpose to provide a clear understanding of the design concept of the present invention. However, an evaporator may be designed and build for example in mirror image configuration, or other orientation related expressions may be used.

Although an exemplary embodiment of the invention has been described above by way of example only, it will be understood by those skilled in the field that modifications may be made to the disclosed embodiment without departing from the scope of the invention, which is defined by the appended claims.

What is claimed is:

1. A multi stage flash cross tube evaporator, comprising:
   an evaporator shell formed substantially by a shell bottom, a shell roof, a left side wall, a right side wall, a front wall and an end wall;
   wherein the shell bottom and shell roof are substantially of rectangular shape and arranged substantially in a horizontal position, while the left side wall, the right side wall, the front wall and the end wall are also substantially of rectangular shape and are arranged substantially in a vertical position; and
   wherein the multi stage flash cross tube evaporator comprising further a horizontal tier partition, substantially extending from the left side wall to the right side wall and from the front wall to the end wall and being arranged substantially in a horizontal position in between the shell bottom and shell roof, dividing the evaporator shell internally into a top tier and a bottom tier; and
   wherein each tier comprising a plurality of first partition walls being arranged substantially vertically and in parallel to the front wall and end wall and extending from the left side wall to the right side wall and in vertical direction in the top tier from the shell roof to the horizontal tier partition below and in the bottom tier from the shell bottom to the horizontal tier partition above, dividing each tier into a plurality of flash stages, with a first flash stage located in each tier next to the front wall, a last flash stage located in each tier next to the end wall and a plurality of intermediate flash stages in each tier located in between the first flash stage and the last flash stage; and
   wherein means are provided to feed a heated solution in parallel into the first flash stage of each tier; and
   wherein openings are cut into the first partition walls to allow the solution to pass in each tier from one flash stage to the next; and
   wherein means are provided to discharge the remaining concentrated solution from the last flash stage of each tier; and
   wherein tube bundles are installed in all flash stases to condense the vapor released from the solution, wherein each tube bundle comprises a plurality of straight tubes substantially extending across the flash stages from the left side wall to the right side wall, being fixed on each end in tube sheets; and
   wherein the tube bundle in at least one flash stage of each tier comprising:
   a first tube bundle pass and a second tube bundle pass; and
   wherein means are provided to feed a first part of a coolant into the tubes of the first tube bundle pass from one end of the tube bundle; and
   wherein further means are provided to feed a second part of the coolant into the tubes of the second tube bundle pass from the opposite end of the tube bundle, so that the second part of a coolant would be conveyed through the tubes of the second tube bundle pass in a opposite direction to the direction the first part of the coolant is conveyed through the tubes of the first tube bundle pass.

2. A multi stage flash cross tube evaporator of claim 1
   wherein the at least one flash stage of each tier comprising further:
   a second partition wall, to divide the at least one flash stage into a pair of flash stages, including a first flash stage and a second flash stage;
   wherein the second partition wall is located below the double pass tube bundle and arranged substantially vertically and in parallel to the first partition walls, while openings in the second partition wall allowing the solution to pass from the first flash stage to the second flash stage of the pair of flash stages; and
   wherein the at least one flash stage of each tier comprising further:
   a tube support plate, a first tube bundle shell part, a second tube bundle shell part, a third tube bundle shell part and a fourth tube bundle shell part, wherein the tube support plate is arranged substantially vertically and parallel to the left side wall and the right side wall of the evaporator shell such that the first tube bundle pass is divided into a first tube bundle pass section to which the first part of the coolant enters into the first tube bundle pass and a second tube bundle pass section from which the first part of the coolant is discharged from the first tube bundle pass; and
   wherein the tube support plate is further arranged such that the second tube bundle pass is divided into a first tube bundle pass section to which the second part of the coolant enters into the second tube bundle pass and a second tube bundle pass section from which the second part of the coolant is discharged from the second tube bundle pass; and
   wherein the first tube bundle shell part partly encloses the second tube bundle pass section of the first tube bundle pass, the second tube bundle shell part partly encloses the first tube bundle pass section of the second tube bundle pass, the third tube bundle shell part partly encloses the first tube bundle pass section of the first tube bundle pass, the fourth tube bundle shell part partly encloses the second tube bundle pass section of the second tube bundle pass and the first, second, third and fourth tube bundle shell parts together with the tube support plate are configured such that a vapor released from the solution in the first flash stage of the pair of flash stages can substantially only enter into and condense at the second tube bundle pass sections of the first and second tube bundle passes and further such that a vapor released from the solution in the second flash stage of the pair of flash stages can substantially only enter into and condense at the first tube bundle pass sections of the first and second tube bundle passes.

* * * * *